(12) United States Patent
Webster et al.

(10) Patent No.: US 11,352,889 B2
(45) Date of Patent: Jun. 7, 2022

(54) AIRFOIL TIP RAIL AND METHOD OF COOLING

(71) Applicant: GENERAL ELECTRIC COMPANY, Schenectady, NY (US)

(72) Inventors: Zachary Daniel Webster, Cincinnati, OH (US); Steven Robert Brassfield, Cincinnati, OH (US); Gregory Terrence Garay, West Chester, OH (US); Tingfan Pang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 16/223,308

(22) Filed: Dec. 18, 2018

(65) Prior Publication Data

US 2020/0190997 A1 Jun. 18, 2020

(51) Int. Cl.
| | |
|---|---|
| *F01D 5/18* | (2006.01) |
| *F01D 5/20* | (2006.01) |
| *F01D 5/30* | (2006.01) |

(52) U.S. Cl.
CPC ............... *F01D 5/187* (2013.01); *F01D 5/20* (2013.01); *F01D 5/3007* (2013.01); *F05D 2240/304* (2013.01); *F05D 2240/305* (2013.01); *F05D 2240/306* (2013.01); *F05D 2240/307* (2013.01); *F05D 2240/81* (2013.01); *F05D 2260/201* (2013.01); *F05D 2260/202* (2013.01)

(58) Field of Classification Search
CPC ......... F05D 2260/202; F05D 2260/201; F05D 2240/81; F05D 2240/307; F05D 2240/306; F05D 2240/305; F05D 2240/304; F01D 5/3007; F01D 5/20; F01D 5/187
See application file for complete search history.

(56) References Cited

U.S. PATENT DOCUMENTS

| | | | |
|---|---|---|---|
| 4,142,824 A | 3/1979 | Anderson | |
| 4,203,706 A | 5/1980 | Hess | |
| 4,487,550 A | 12/1984 | Horvath et al. | |
| 4,505,639 A | 3/1985 | Groess et al. | |
| 4,669,957 A | 6/1987 | Phillips et al. | |
| 4,672,727 A | 6/1987 | Field | |
| 4,726,735 A | 2/1988 | Field et al. | |
| 4,859,147 A | 8/1989 | Hall et al. | |
| 5,223,320 A | 6/1993 | Richardson | |
| 5,356,265 A | 10/1994 | Kercher | |
| 5,383,766 A | 1/1995 | Przirembel et al. | |

(Continued)

FOREIGN PATENT DOCUMENTS

| | | |
|---|---|---|
| EP | 3124745 A1 | 2/2017 |
| EP | 3124746 A1 | 2/2017 |

(Continued)

*Primary Examiner* — Courtney D Heinle
*Assistant Examiner* — Andrew Thanh Bui
(74) *Attorney, Agent, or Firm* — McGarry Bair PC

(57) ABSTRACT

An airfoil for a turbine engine includes an outer wall bounding an interior and defining a pressure side and a suction side, the outer wall extending axially between a leading edge and a trailing edge to define a chord-wise direction, and also extending radially between a root and a tip to define a span-wise direction. At least one cooling conduit can be formed in the interior of the airfoil, and a tip rail can project from the tip in the span-wise direction.

14 Claims, 5 Drawing Sheets

(56) References Cited

U.S. PATENT DOCUMENTS

| | | |
|---|---|---|
| 5,387,085 A | 2/1995 | Thomas, Jr. et al. |
| 5,392,515 A | 2/1995 | Auxier et al. |
| 5,405,242 A | 4/1995 | Auxier et al. |
| 5,486,093 A | 1/1996 | Auxier et al. |
| 5,503,529 A | 4/1996 | Anselmi et al. |
| 5,660,523 A | 8/1997 | Lee |
| 5,667,359 A | 9/1997 | Huber et al. |
| 5,702,232 A | 12/1997 | Moore |
| 5,720,431 A | 2/1998 | Sellers et al. |
| 5,931,638 A | 8/1999 | Krause et al. |
| 6,086,328 A | 7/2000 | Lee |
| 6,099,251 A | 8/2000 | LaFleur |
| 6,241,468 B1 | 6/2001 | Lock et al. |
| 6,254,334 B1 | 7/2001 | LaFleur |
| 6,379,118 B2 | 4/2002 | Lutum et al. |
| 6,402,470 B1 | 6/2002 | Kvasnak et al. |
| 6,402,471 B1 | 6/2002 | Demers et al. |
| 6,478,537 B2 | 11/2002 | Junkin |
| 6,551,062 B2 | 1/2003 | Leeke et al. |
| 6,773,231 B2 | 8/2004 | Bunker et al. |
| 6,790,005 B2 | 9/2004 | Lee et al. |
| 6,832,889 B1 | 12/2004 | Lee et al. |
| 6,869,270 B2 | 3/2005 | Bunker et al. |
| 6,994,514 B2 | 2/2006 | Soechting et al. |
| 7,029,235 B2 * | 4/2006 | Liang ................ F01D 5/18 416/232 |
| 7,121,787 B2 | 10/2006 | Jacks et al. |
| 7,255,534 B2 | 8/2007 | Liang |
| 7,334,412 B2 | 2/2008 | Tiemann |
| 7,364,405 B2 | 4/2008 | Cunha et al. |
| 7,467,922 B2 | 12/2008 | Beeck et al. |
| 7,497,660 B2 | 3/2009 | Liang |
| 7,563,072 B1 | 7/2009 | Liang |
| 7,568,882 B2 * | 8/2009 | Brittingham ........ F01D 5/187 415/1 |
| 7,632,062 B2 | 12/2009 | Harvey et al. |
| 7,665,956 B2 | 2/2010 | Mitchell et al. |
| 7,686,580 B2 | 3/2010 | Cunha et al. |
| 7,686,582 B2 | 3/2010 | Cunha |
| 7,785,071 B1 | 8/2010 | Liang |
| 7,789,626 B1 | 9/2010 | Liang |
| 7,815,414 B2 | 10/2010 | Devore et al. |
| 8,043,058 B1 | 10/2011 | Liang |
| 8,057,182 B2 | 11/2011 | Brittingham et al. |
| 8,066,485 B1 | 11/2011 | Liang |
| 8,079,812 B2 | 12/2011 | Okita |
| 8,092,176 B2 | 1/2012 | Liang |
| 8,105,030 B2 | 1/2012 | Abdel-Messeh et al. |
| 8,109,726 B2 | 2/2012 | Liang |
| 8,172,534 B2 | 5/2012 | Ammann et al. |
| 8,262,357 B2 | 9/2012 | Mhetras |
| 8,313,287 B2 | 11/2012 | Little |
| 8,317,476 B1 | 11/2012 | Liang |
| 8,454,310 B1 | 6/2013 | Downs |
| 8,469,666 B1 | 6/2013 | Liang |
| 8,647,053 B2 | 2/2014 | Hsu et al. |
| 8,651,805 B2 | 2/2014 | Lacy et al. |
| 8,714,926 B2 | 5/2014 | Lee et al. |
| 8,840,363 B2 | 9/2014 | Lee |
| 8,851,848 B1 | 10/2014 | Liang |
| 8,864,469 B1 | 10/2014 | Liang |
| 9,127,560 B2 * | 9/2015 | Collier ................ F01D 5/225 |
| 9,133,715 B2 | 9/2015 | Lutjen et al. |
| 9,151,175 B2 | 10/2015 | Tham et al. |
| 9,234,438 B2 | 1/2016 | Lee |
| 9,249,670 B2 | 2/2016 | Bunker |
| 9,260,972 B2 | 2/2016 | Zelesky et al. |
| 9,273,561 B2 | 3/2016 | Lacy et al. |
| 9,279,330 B2 | 3/2016 | Xu et al. |
| 9,297,262 B2 | 3/2016 | Zhang et al. |
| 9,366,143 B2 | 6/2016 | Lee et al. |
| 9,394,796 B2 | 7/2016 | Lacy et al. |
| 9,447,692 B1 | 9/2016 | Liang |
| 9,470,095 B2 | 10/2016 | Propheter-Hinckley et al. |
| 9,605,545 B2 | 3/2017 | Grohens et al. |
| 9,670,782 B2 | 6/2017 | Gohler et al. |
| 9,777,577 B2 | 10/2017 | Brandl et al. |
| 9,777,582 B2 | 10/2017 | Zelesky et al. |
| 9,840,927 B2 | 12/2017 | Tucker |
| 9,840,930 B2 | 12/2017 | Lee et al. |
| 9,856,739 B2 | 1/2018 | Bedrosyan et al. |
| 9,879,601 B2 | 1/2018 | Vandervaart et al. |
| 9,890,644 B2 | 2/2018 | Tran et al. |
| 9,896,942 B2 | 2/2018 | Shepherd |
| 9,896,954 B2 | 2/2018 | Walston et al. |
| 9,938,899 B2 | 4/2018 | Miranda et al. |
| 9,957,817 B2 | 5/2018 | Zelesky et al. |
| 9,982,541 B2 | 5/2018 | Kwon et al. |
| 2006/0002788 A1 | 1/2006 | Liang |
| 2014/0033736 A1 | 2/2014 | Propheter-Hinckley et al. |
| 2014/0178207 A1 * | 6/2014 | He ................ F01D 11/08 416/96 R |
| 2015/0345298 A1 | 12/2015 | Mongillo et al. |
| 2015/0345304 A1 | 12/2015 | Mongillo et al. |
| 2016/0076552 A1 | 3/2016 | Anderson et al. |
| 2016/0169003 A1 | 6/2016 | Wong et al. |
| 2016/0237828 A1 | 8/2016 | Burd |
| 2017/0007824 A1 | 1/2017 | Gardner et al. |
| 2017/0030198 A1 | 2/2017 | Kruckels et al. |
| 2017/0234134 A1 | 8/2017 | Bunker |
| 2017/0298823 A1 | 10/2017 | Harding |
| 2017/0306746 A1 | 10/2017 | Konitzer et al. |
| 2018/0058226 A1 | 3/2018 | Tucker et al. |
| 2018/0128115 A1 | 5/2018 | Hudson et al. |
| 2018/0135423 A1 | 5/2018 | Dyson et al. |
| 2018/0156045 A1 | 6/2018 | Clum et al. |
| 2018/0171872 A1 | 6/2018 | Dyson et al. |
| 2018/0179956 A1 | 6/2018 | Wertz |
| 2018/0202296 A1 | 7/2018 | Kiener et al. |
| 2018/0230832 A1 | 8/2018 | Dierksmeier |

FOREIGN PATENT DOCUMENTS

| | | |
|---|---|---|
| JP | 2009221995 A | 10/2009 |
| WO | 2018093627 A3 | 5/2018 |

* cited by examiner

AIRFOIL TIP RAIL AND METHOD OF COOLING

BACKGROUND

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is at a high temperature, it is cooler relative to the turbine air, and can be used to cool the turbine.

Contemporary turbine engine airfoils generally include one or more interior cooling circuits for routing the cooling air through the airfoil to cool different portions of the airfoil, and can include dedicated cooling circuits for cooling different portions of the airfoil.

BRIEF DESCRIPTION

In one aspect, the disclosure relates to an airfoil for a turbine engine. The airfoil includes an outer wall bounding an interior and defining a pressure side and a suction side, the outer wall extending axially between a leading edge and a trailing edge to define a chord-wise direction, and also extending radially between a root and a tip to define a span-wise direction, at least one cooling conduit formed in the interior of the airfoil, a tip rail projecting from the tip in the span-wise direction, the tip rail including an exterior surface spaced from an interior surface with a tip surface connecting the exterior and interior surfaces, and a three-dimensional plexus of fluidly interconnected cooling passages provided within the tip rail between the exterior and interior surfaces and fluidly coupled to the at least one cooling conduit.

In another aspect, the disclosure relates to a turbine engine. The turbine engine can include a compressor, a combustor, and a turbine in axial flow arrangement, and an airfoil including an outer wall bounding an interior and defining a pressure side and a suction side, the outer wall extending axially between a leading edge and a trailing edge to define a chord-wise direction, and also extending radially between a root and a tip to define a span-wise direction, at least one cooling conduit formed in the interior of the airfoil, a tip rail projecting from the tip in the span-wise direction, the tip rail including an exterior surface spaced from an interior surface with a tip surface connecting the exterior and interior surfaces, and a three-dimensional plexus of fluidly interconnected cooling passages provided at least partially within the tip rail between the exterior and interior surfaces and fluidly coupled to the at least one cooling conduit.

In yet another aspect, the disclosure relates to a method of cooling an airfoil having a tip rail in a turbine engine. The method includes flowing cooling air through at least one cooling conduit within an interior of the airfoil, flowing the cooling air from the at least one cooling conduit through a three-dimensional plexus of fluidly interconnected cooling passages located at least partially within the tip rail, and ejecting the cooling air from the three-dimensional plexus through a set of outlets located on the tip rail.

DESCRIPTION OF EMBODIMENTS

Figure 1:
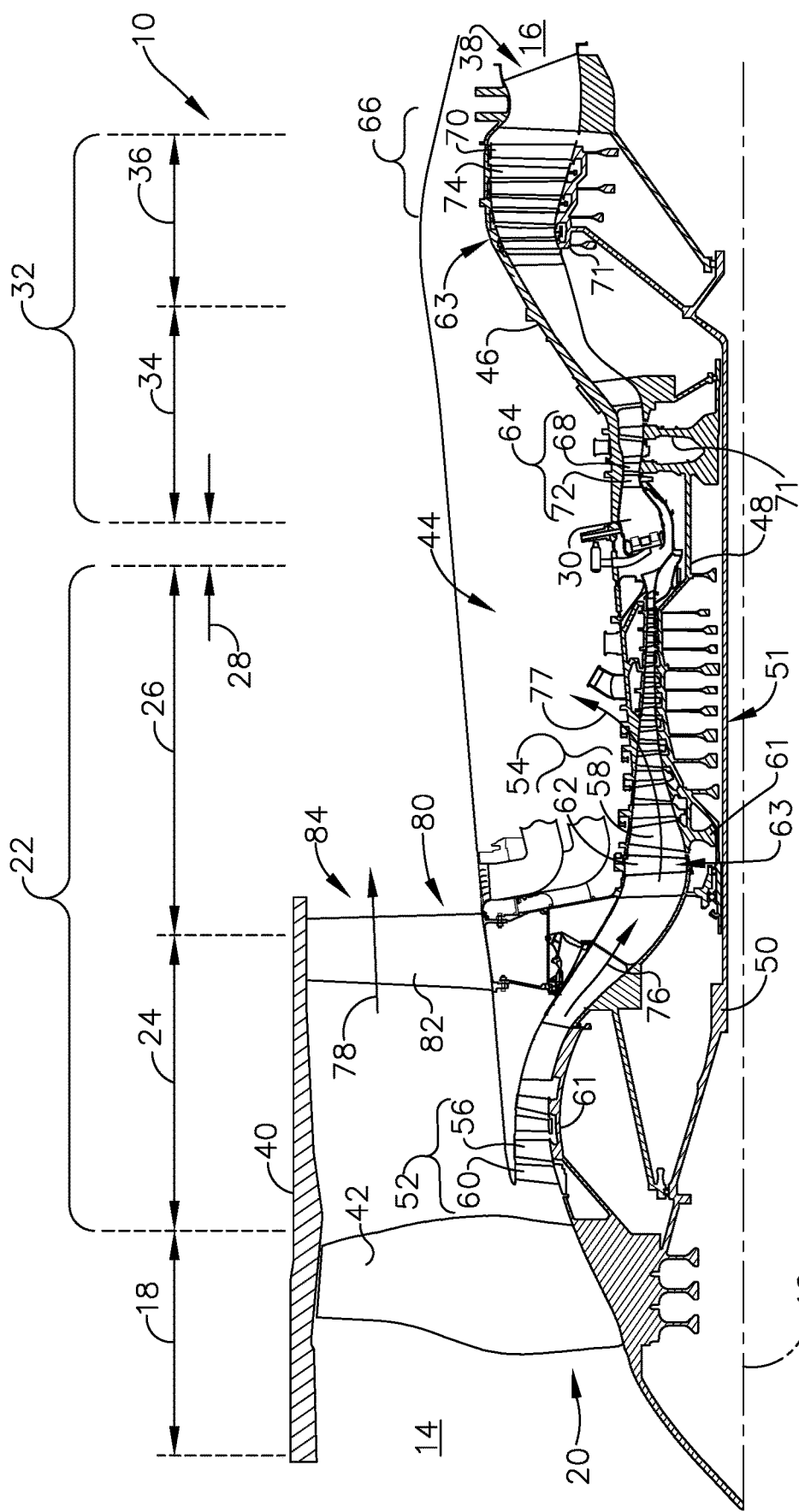
FIG. 1 is a schematic cross-sectional diagram of a turbine engine for an aircraft.

The described embodiments of the present disclosure are directed to a cooled airfoil and tip rail for a turbine engine. For purposes of illustration, the present disclosure will be described with respect to an aircraft turbine engine. It will be understood, however, that the disclosure is not so limited and may have general applicability within an engine, including a compressor section or turbine section of a turbine engine, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP)

compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
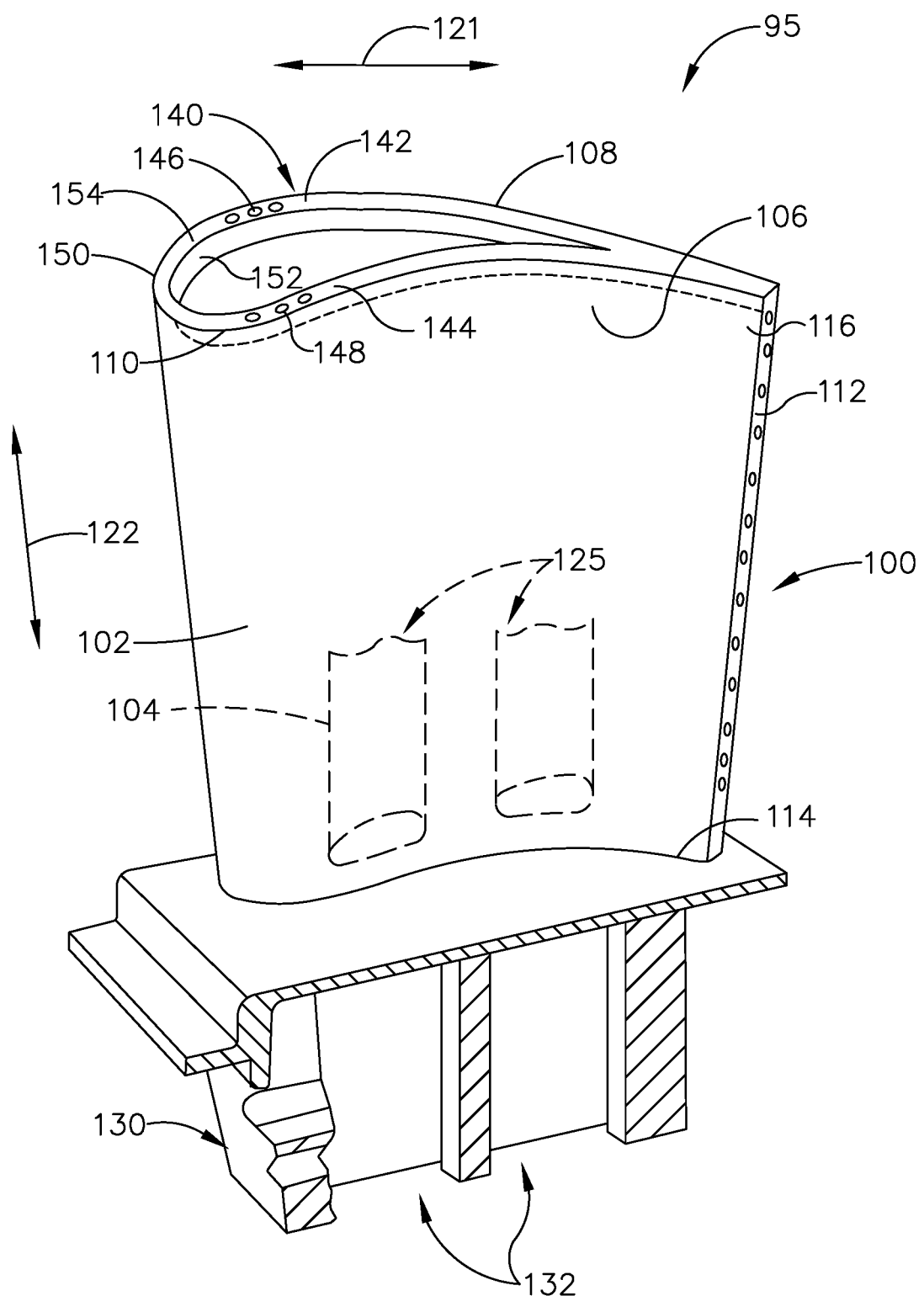
FIG. 2 is a perspective view of an airfoil assembly in the turbine engine of FIG. 1 including an airfoil according to various aspects described herein.

Referring now to FIG. 2, a perspective view of an airfoil assembly 95 is shown that can be utilized in the turbine engine 10 (FIG. 1). The airfoil assembly 95 can be utilized anywhere in the turbine engine 10, including the compressor section 22 or turbine section 32 in non-limiting examples.

The airfoil assembly 95 includes an airfoil 100 with an outer wall 102 bounding an interior 104 and defining a pressure side 106 and suction side 108. The outer wall 102 extends axially between a leading edge 110 and a trailing edge 112 to define a chord-wise direction 121. The outer wall 102 also extends radially between a root 114 and a tip 116 to define a span-wise direction 122.

The airfoil 100 can also be mounted to a dovetail 130 at the root 114. The dovetail 130 can include a set of dovetail cooling passages 132. A set of cooling conduits 125 can be formed in the interior 104 of the airfoil 100. The set of dovetail cooling passages 132 can fluidly couple with the set of cooling conduits 125 to supply cooling air to the interior 104 of the airfoil 100.

A tip rail 140 can project from the tip 116 of the airfoil 100 in the span-wise direction 122. The tip rail 140 can include a suction-side portion 142 located on the suction side 108, as well as a pressure-side portion 144 located on the pressure side 106 of the airfoil 100. A set of suction-side outlets 146 can be located on the suction-side portion 142. The suction-side outlets 146 can be fluidly coupled to the set of cooling conduits 125 or the set of dovetail cooling passages 132. Optionally, a set of pressure-side outlets 148 can be provided on the pressure-side portion 144 of the tip rail 140 and fluidly couple to the set of cooling conduits 125.

The tip rail 140 can also include an exterior surface 150 spaced from an interior surface 152, where a tip surface 154 can connect the exterior and interior surfaces 150, 152. It is contemplated that the suction-side outlets 146 can be located on at least one of the exterior surface 150, tip surface 154, or interior surface 152 of the suction-side portion 142 of the tip rail 140 as desired. While shown on the tip surface 154, it will be understood that the suction-side outlets 146 and pressure-side outlets 148 can also be located on the exterior surface 150 or interior surface 152 of the tip rail 140. In addition, it is contemplated that the suction-side outlets 146 and pressure-side outlets 148 can include any type of outlets, such as a film hole, ejection hole, in-line diffuser, diffusing slot, or channel, in non-limiting examples.

Figure 3:
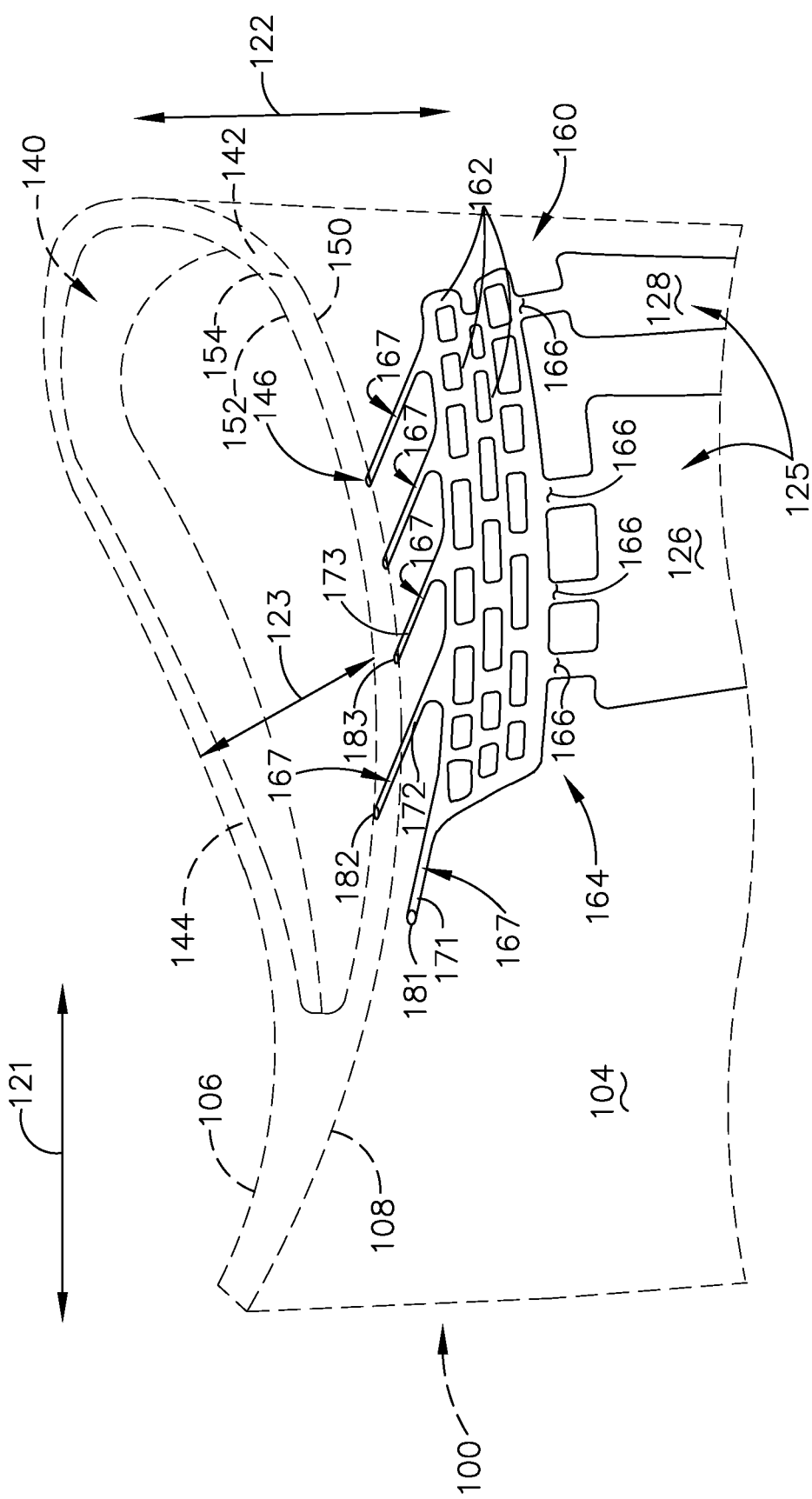
FIG. 3 is a perspective view of the airfoil of FIG. 2 including a tip rail and a network of cooling passages.

Turning to FIG. 3, the airfoil 100 and tip rail 140 are shown in dotted-line for clarity, with the suction side 108 more clearly seen. It is further contemplated that a three-dimensional plexus 160 of fluidly interconnected cooling passages 162, shown in solid line, can be provided within the airfoil 100. The three-dimensional plexus 160 is illustrated schematically with "flat" passages and regions. It should be understood that the three-dimensional plexus 160 shown in solid line represents a three-dimensional void within the airfoil 100.

The three-dimensional plexus 160 can be formed using a variety of methods, including additive manufacturing, casting, electroforming, or direct metal laser melting, in non-limiting examples. It is contemplated that the airfoil 100 having the plexus 160 can be an additively manufactured component. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, metal, composite, or other. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination.

The three-dimensional plexus 160 can be provided at least partially within the tip rail 140 between the exterior and interior surfaces 150, 152. In the illustrated example, the set of cooling conduits 125 can further include a first cooling conduit 126 and a leading-edge cooling conduit 128 each fluidly coupled to the three-dimensional plexus 160. It should be understood that any number of cooling conduits can be included within the interior 104 of the airfoil 100. In an alternate example (not shown), the three-dimensional plexus can have a first plexus portion fluidly coupled to a first cooling conduit and a second plexus portion, locally separated from the first portion, fluidly coupled to a second cooling conduit.

The three-dimensional plexus 160 can include a lattice portion 164 having at least one impingement zone 166 fluidly coupled to either or both of the first or leading-edge cooling conduit 126, 128. In the example shown, three impingement zones 166 are fluidly coupled to the first cooling conduit 126 and one impingement zone 166 is fluidly coupled to the leading-edge cooling conduit 128. Any number of impingement zones can be provided. In addition, an impingement zone 166 can optionally have a narrower cross-sectional area than its fluidly-coupled cooling conduit (e.g. the cooling conduits 126, 128) such that air flowing through the impingement zone 166 is accelerated into the lattice portion 164.

The lattice portion 164 in one example can form a lattice pin bank, and can also extend at least in the span-wise direction 122 and the chord-wise direction 121. It should be understood that the cooling passages 162 forming the lattice portion 164 can extend in multiple directions, including in a cross-wise direction 123 between the pressure side 106 and suction side 108, such that the lattice portion 164 can provide for airflow in three dimensions within the airfoil 100. The cooling passages 162 can have a constant or variable cross-sectional width, and can also have any desired cross-sectional geometry including rounded or squared corners in non-limiting examples.

A set of elongated ejection holes 167 can be included in the three-dimensional plexus 160 and extend from the lattice portion 164. The ejection holes 167 can extend at least axially (e.g. in the chord-wise direction 121) or radially (e.g. in the span-wise direction 122) from the lattice portion 164. The set of elongated ejection holes 167 can be fluidly coupled to a set of outlets, such as the set of suction-side outlets 146 on the tip rail 140. For example, a first suction-side outlet 171 is shown on the exterior surface 150 and fluidly coupled to a first ejection hole 181, a second suction-side outlet 172 is shown on the interior surface 152 and fluidly coupled to a second ejection hole 182, and a third suction-side outlet 173 is shown on the tip surface 154 and fluidly coupled to a third ejection hole 183. It will be understood that any number and arrangement of suction-side outlets 146 and ejection holes 167 can be utilized. In this manner, the set of suction-side outlets 146 can be fluidly coupled to the three-dimensional plexus 160.

Figure 4:
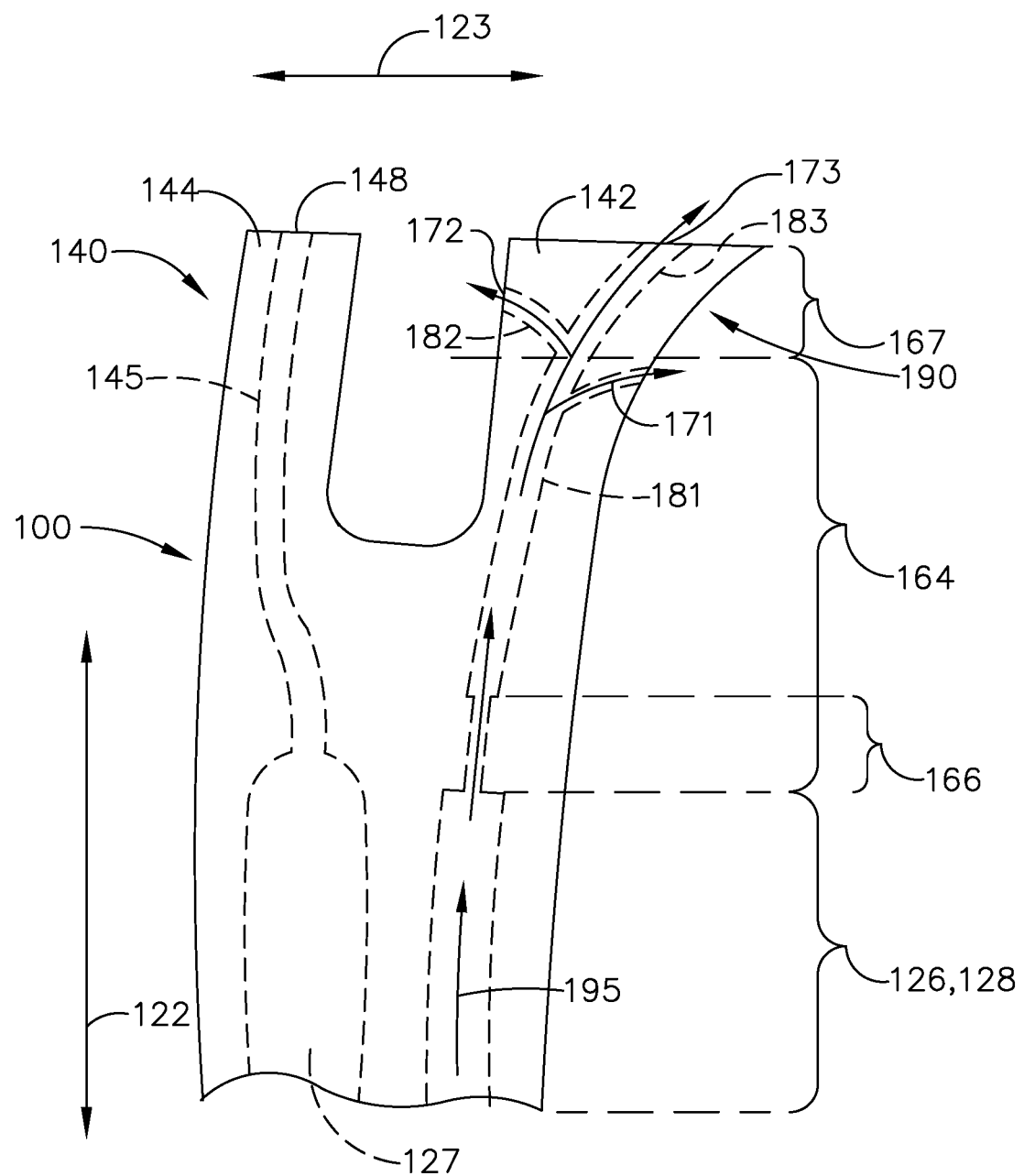
FIG. 4 is a side sectional view of the airfoil of FIG. 2.

FIG. 4 schematically illustrates an axial view of the airfoil 100 (shown in solid line), where arrows 195 illustrate the flow of cooling air through the cooling conduits 126, 128 (shown in dotted line, and overlapping in this view) and three-dimensional plexus 160 (shown in solid line). The first, second, and third ejection holes 181, 182, 183 are shown coupled to the respective first, second, and third suction-side outlets 171, 172, 173.

It is further contemplated that the airfoil 100 can include at least one winglet 190. In the illustrated example, the winglet 190 is included in the suction-side portion 142 of the tip rail 140 and defines a portion of the airfoil 100 or tip rail 140 that extends in the cross-wise direction 123 orthogonal to the span-wise direction 122. For example, winglets can be included in airfoils to improve aerodynamic performance of the airfoil or tailor airflows surrounding the airfoil. In addition, the three-dimensional plexus 160 can be located at least partially within the winglet 190, as shown by the lattice portion 164 and set of elongated ejection holes 167 curving in the cross-wise direction 123 along with the winglet 190.

In the illustrated example, the pressure-side portion 144 of the tip rail 140 can also include at least one pressure-side cooling passage 145 between the exterior and interior surfaces 150, 152. The pressure-side cooling passage 145 is shown as being fluidly coupled to a second cooling conduit 127 within the interior 104 of the airfoil 100. A set of pressure-side outlets 148 can be located on the pressure-side portion 144 of the tip rail 140 and fluidly coupled to the pressure-side cooling passage 145. As described above, while shown on the tip surface 154 of the pressure-side portion 144, the pressure-side outlets 148 can also be located on the exterior surface 150 or interior surface 152. It is contemplated that the second cooling conduit 127 can be fluidly separated from the first cooling conduit 126 or the leading-edge cooling conduit 128. Alternately, any or all of the first, second, or leading-edge cooling conduits 126, 127, 128 can be fluidly coupled, such as via a common dovetail cooling passage 132 (FIG. 2). In this manner, a first cooling conduit can be fluidly coupled to the three-dimensional plexus 160 and a second cooling conduit can be fluidly coupled to at least one cooling passage provided within the pressure-side portion 144 of the tip rail 140.

Figure 5:
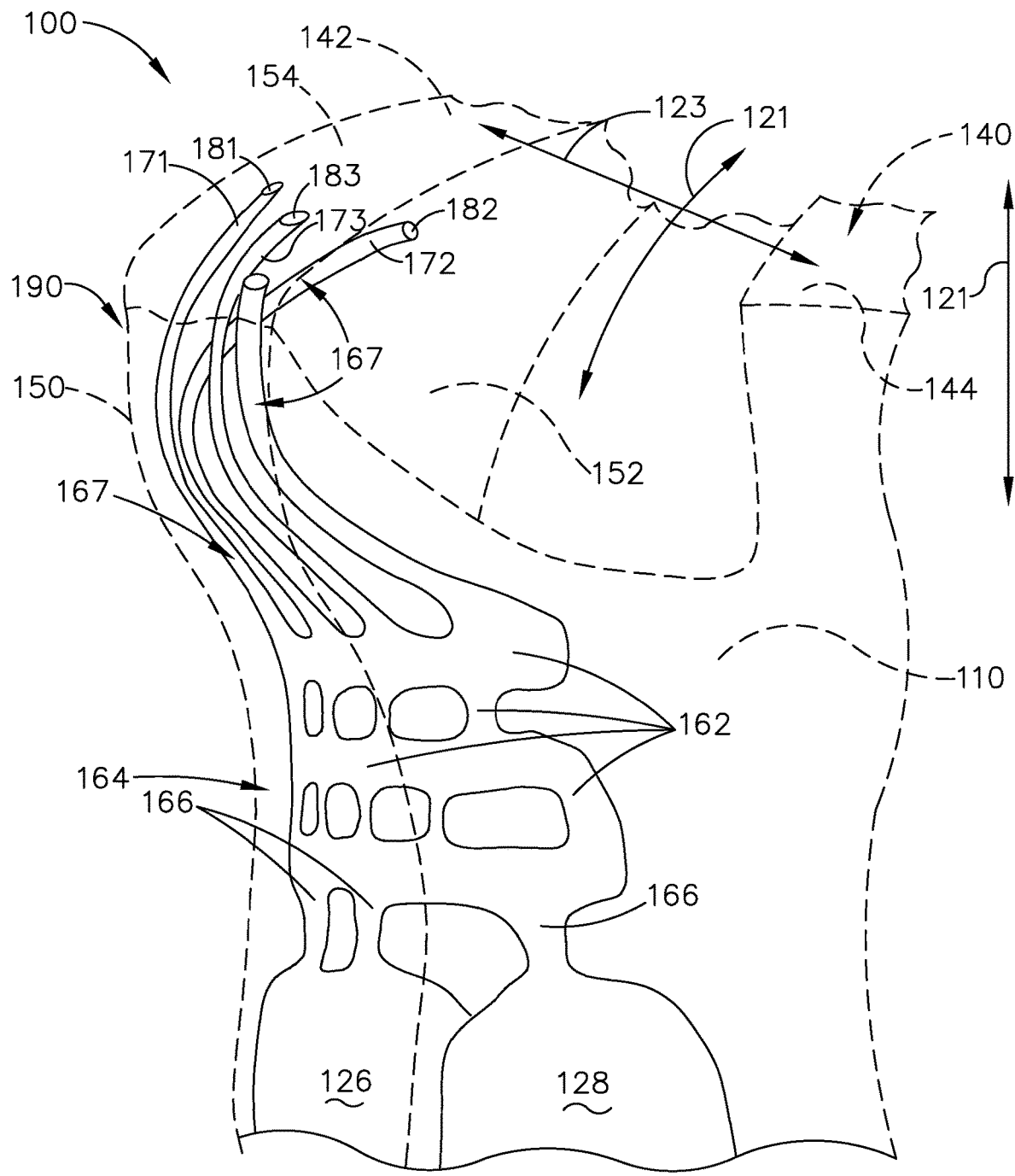
FIG. 5 is a schematic view of the network of cooling passages of FIG. 3.

Turning to FIG. 5, a perspective view of the tip rail 140 is shown in dotted line proximate the leading edge 110 of the airfoil 100. A portion of the three-dimensional plexus 160 is schematically illustrated in solid line. It is contemplated that the three-dimensional plexus 160 can extend or curve three-dimensionally in the span-wise direction 122, the chord-wise direction 121, or the cross-wise direction 123. The three-dimensional plexus 160 can curve within the tip rail 140, such as within the winglet 190, and the elongated ejection holes 167 can extend at least axially in the chord-wise direction 121, at least radially in the span-wise direction 122, or at least in the cross-wise direction 123. In addition, the elongated ejection holes 167 can be parallel with one another, or adjacent ejection holes 167 can be unaligned or intertwined with one another. In the illustrated example, the first, second, and third ejection holes 181, 182, 183 can curve in three dimensions within the winglet 190 and fluidly couple to their respective suction-side outlets 171, 172, 173 on the respective exterior surface 150, interior surface 152, and tip surface 154 as described above.

During operation, cooling air supplied from the set of dovetail cooling passages 132 can flow from the set of cooling conduits 125 through the impingement zone 166 to impinge at least one passage wall within the lattice portion 164 and provide initial cooling to the lattice portion 164. Cooling air can be directed through the lattice portion 164 in a variety of directions, including at least two dimensions or in three dimensions, and can then flow through the elongated ejection holes 167. Cooling air can exit the tip rail 140 via the set of suction-side outlets 146 or the pressure-side outlets 148. Optionally, the winglet 190 can provide for improved aerodynamic flow around the airfoil 100 as well as additional directional flow for the cooling air exiting the suction-side portion 142 of the tip rail 140.

It should be understood that the airfoil and plexus described above can include any suitable arrangement or position of ejection holes, outlets, lattice portion, and the like. For example, cooling air can move radially outward, radially inward, axially, or the like, or any combination thereof within the airfoil interior while moving through the plexus and toward the outlets.

In one non-limiting example (not shown), the lattice portion of the plexus can extend along at least a portion of both the trailing edge and the tip of the airfoil, and the ejection holes can extend from the lattice portion to outlets located on both the tip rail and trailing edge. In addition, a single ejection hole can branch or divide to be fluidly coupled to multiple outlets, such as to a first outlet on the tip rail and to a second outlet on the trailing edge in one example.

In another non-limiting example (not shown), at least a portion of the lattice portion can be directly fluidly coupled to tip rail outlets without the elongated ejection holes. In such a case, the lattice portion can extend fully through the tip rail and fluidly couple to the outlets, including outlets located on the exterior surface, interior surface, or tip surface of the tip rail. The lattice portion can also be fluidly coupled to other outlets located on the pressure side or suction side of the airfoil, including by way of the elongated ejection holes or by directly fluidly coupling to the outlets without such ejection holes.

In yet another non-limiting example (not shown), the plexus can further include multiple discrete groups of cooling passages each fluidly supplied by a separate cooling conduit. Each of the multiple discrete groups can include any or all of the impingement zone, lattice portion, or elongated ejection holes. The multiple discrete groups can be fluidly coupled, for example by a single connecting fluid passage, or they can be separated within the airfoil interior. In addition, the multiple discrete groups can form multiple impingement zones arranged radially within the airfoil, such that cooling air supplied from the cooling conduit can impinge a first zone, impinge a second zone, impinge a third zone, and so on, until exiting via a cooling hole outlet.

In still another non-limiting example (not shown), the cooling conduit can "blend" or transition into the lattice portion without an intervening impingement zone. In such a case, cooling air supplied by the cooling conduit can flow directly into the lattice portion and be smoothly directed into passages therein without impingement.

In still another non-limiting example (not shown), a radially-oriented elongated ejection hole can be fluidly coupled to a second radially-oriented passage with an outlet, such as a film hole on the pressure side of the airfoil. In such a case, cooling air flowing through the plexus can flow radially outward through the ejection hole, radially inward through the passage, and then out through the film hole.

Aspects provide for a method of cooling an airfoil having a tip rail in a turbine engine. The method includes flowing cooling air through at least one cooling conduit, such as the set of cooling conduits 125, within the interior 104 of the airfoil 100. The method also includes flowing the cooling air from the set of cooling conduits 125 the three-dimensional plexus 160 of fluidly interconnected cooling passages 162 located at least partially within the tip rail 140. Optionally, the method can further include impinging the cooling air within the impingement zone 166 of the three-dimensional plexus 160. The method also includes ejecting the cooling air from the three-dimensional plexus 160 through a set of outlets, such as the suction-side outlets 146, located on the tip rail 140.

Aspects of the disclosure provide for a variety of benefits. The use of the three-dimensional plexus, impingement zones, and elongated ejection holes can increase the heat transfer to the cooling air from the airfoil and direct the now-heated cooling air to a location of the airfoil that can handle higher coolant temperatures. It can be appreciated that the elongated ejection holes can improve bore cooling, while the lattice with impingement zones can provide impingement cooling while directing the cooling air to various portions of the airfoil, including those portions where film cooling performance is traditionally limited. This enables higher convection of cooling air within the airfoil using the same or less supplied airflow compared with traditional cooling designs. The lattice portion can provide for increased working or mixing of the cooling air within the airfoil, which can improve cooling performance. In addition, the elongated ejection holes can be utilized to eject or sink the cooling air to a region with a lower air or sink pressure. Such lower sink pressures can maintain the flow of cooling air moving through and out of the three-dimensional plexus with reduced back flow, which further improves cooling performance.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
   an outer wall bounding an interior and defining a pressure side and a suction side, the outer wall extending axially between a leading edge and a trailing edge to define a chord-wise direction, and also extending radially between a root and a tip to define a span-wise direction;
   at least one cooling conduit formed in the interior of the airfoil;
   a tip rail projecting from the tip in the span-wise direction, the tip rail comprising an exterior surface spaced from an interior surface with a tip surface connecting the exterior and interior surfaces and also comprising a winglet extending orthogonally to the span-wise direction; and
   a three-dimensional plexus of fluidly interconnected cooling passages provided at least partially within the tip rail between the exterior and interior surfaces, the three-dimensional plexus comprising:
     an impingement zone fluidly coupled to the at least one cooling conduit;
     a lattice portion located radially outward of the impingement zone and at least partially within the tip rail, with the lattice portion fluidly coupled to the impingement zone; and
     a set of elongated ejection holes extending from the lattice portion between the exterior and interior surfaces and having a first outlet on one of the exterior surface, the tip surface, or the interior surface, and having a second outlet on a different one of the exterior surface, the tip surface, or the interior surface.

2. The airfoil of claim 1 wherein the tip rail further comprises a suction-side portion located on the suction side of the airfoil.

3. The airfoil of claim 2 further comprising a set of suction-side outlets located on the suction-side portion and fluidly coupled to the three-dimensional plexus.

4. The airfoil of claim 3 wherein the set of suction-side outlets is located on at least one of the exterior surface, the interior surface, or the tip surface of the suction-side portion of the tip rail.

5. The airfoil of claim 1 wherein the three-dimensional plexus is located at least partially within the winglet.

6. The airfoil of claim 1 further comprising at least one cooling passage provided within a pressure-side portion of the tip rail between the exterior surface and the interior surface and fluidly coupled to the at least one cooling conduit.

7. The airfoil of claim 6 wherein the at least one cooling passage has a set of pressure-side outlets located on the pressure-side portion of the tip rail.

8. The airfoil of claim 6 wherein the at least one cooling conduit comprises at least a first cooling conduit fluidly coupled to the three-dimensional plexus and a second cooling conduit fluidly coupled to the at least one cooling passage.

9. The airfoil of claim 1 wherein the impingement zone comprises a narrowed cross-sectional area compared to the at least one cooling conduit.

10. An airfoil for a turbine engine, the airfoil comprising:
    an outer wall bounding an interior and defining a pressure side and a suction side, the outer wall extending axially between a leading edge and a trailing edge to define a chord-wise direction, and also extending radially between a root and a tip to define a span-wise direction;
    at least one cooling conduit formed in the interior of the airfoil;
    a tip rail projecting from the tip in the span-wise direction, the tip rail comprising an exterior surface spaced from an interior surface and a winglet extending orthogonally to the span-wise direction; and
    a three-dimensional plexus of fluidly interconnected cooling passages provided at least partially within the tip rail between the exterior and interior surfaces, the three-dimensional plexus comprising:
      an impingement zone fluidly coupled to the at least one cooling conduit;
      a lattice portion located radially outward of the impingement zone and at least partially within the tip rail, with the lattice portion fluidly coupled to the impingement zone; and
      a set of elongated ejection holes extending from the lattice portion between the exterior and interior surfaces and having at least one outlet on the winglet.

11. The airfoil of claim 10 wherein the tip rail further comprises a suction-side portion located on the suction side of the airfoil, and wherein the three-dimensional plexus is located at least partially within the suction-side portion.

12. The airfoil of claim 11 further comprising a set of suction-side outlets located on the suction-side portion and fluidly coupled to the three-dimensional plexus.

13. The airfoil of claim 12 wherein the set of suction-side outlets is located on at least one of the exterior surface or the interior surface of the suction-side portion of the tip rail.

14. A method of cooling a turbine engine airfoil having a tip rail projecting in a span-wise direction to the turbine engine airfoil and defining an exterior surface, an interior surface, a tip surface connecting the exterior and interior surfaces, the tip rail also having a winglet extending orthogonally to the span-wise direction, the method comprising:
- flowing cooling air through at least one cooling conduit within an interior of the airfoil;
- flowing the cooling air from the at least one cooling conduit sequentially through an impingement zone and a lattice portion of a three-dimensional plexus; and
- ejecting the cooling air from the lattice portion through a set of elongated ejection holes between the exterior and interior surfaces and having a corresponding set of outlets, the set of outlets comprising at least one outlet on the winglet.

* * * * *